(12) United States Patent
Ishihara et al.

(10) Patent No.: US 9,781,647 B2
(45) Date of Patent: Oct. 3, 2017

(54) COMMUNICATION SYSTEM FOR TRANSFERRING DATA BETWEEN DECT TERMINAL AND WIDE AREA WIRELESS BASE STATION

(71) Applicant: Panasonic Intellectual Property Management Co., Ltd., Osaka (JP)

(72) Inventors: Hiroyuki Ishihara, Fukuoka (JP); Akira Shibuta, Fukuoka (JP); Shinji Ikegami, Fukuoka (JP); Hirokazu Sugiyama, Fukuoka (JP); Takashi Enoki, Fukuoka (JP); Kazuhide Shibata, Fukuoka (JP); Masayuki Nagano, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/199,022

(22) Filed: Jun. 30, 2016

(65) Prior Publication Data

US 2017/0019824 A1    Jan. 19, 2017

(30) Foreign Application Priority Data

Jul. 15, 2015 (JP) ................................ 2015-141254

(51) Int. Cl.
*H04M 1/72* (2006.01)
*H04W 88/08* (2009.01)
(Continued)

(52) U.S. Cl.
CPC ............. *H04W 36/14* (2013.01); *H04J 11/00* (2013.01); *H04L 47/29* (2013.01);
(Continued)

(58) Field of Classification Search
CPC ..... H04W 48/18; H04W 84/04; H04W 84/10; H04W 88/10; H04W 84/12;
(Continued)

(56) References Cited

U.S. PATENT DOCUMENTS 7,257,404 B1 * 8/2007 Chow et al. .................. 455/436
9,185,192 B2 * 11/2015 Lee ........................ H04M 1/006
(Continued)

FOREIGN PATENT DOCUMENTS

JP    2014-158191 A    8/2014

OTHER PUBLICATIONS

Extended European Search Report, dated Dec. 14, 2016, for corresponding EP Application No. 16176316.4-1854, 11 pages.

*Primary Examiner* — Meless Zewdu
(74) *Attorney, Agent, or Firm* — Seed IP Law Group LLP

(57) ABSTRACT

Data is transferred between a DECT terminal and an LTE base station.

A base unit includes a DECT communication unit and an LTE communication unit, the DECT communication unit performing DECT communication with a DECT terminal, and the LTE communication unit transmitting and receiving data with the DECT communication unit and performing LTE communication with an LTE carrier gateway through an LTE base station. The DECT communication unit transmits a connection verification request to the LTE communication unit in order to verify a connection state of an LTE link with the LTE carrier gateway. The LTE communication unit transmits a connection verification response to the DECT communication unit in response to the connection verification request in a case where an LTE link is connected. The DECT communication unit, in a case where the DECT communication unit receives a DECT connection request for requesting connection of an DECT link from the (Continued)

DECT terminal and receives the connection verification response from the LTE communication unit, transmits a DECT connection response to the DECT terminal in response to the DECT connection request.

6 Claims, 10 Drawing Sheets

(51) Int. Cl.

| | | |
|---|---|---|
| *H04W 88/10* | (2009.01) | |
| *H04W 36/14* | (2009.01) | |
| *H04W 48/18* | (2009.01) | |
| *H04J 11/00* | (2006.01) | |
| *H04L 12/801* | (2013.01) | |
| *H04M 1/02* | (2006.01) | |
| *H04W 72/10* | (2009.01) | |
| *H04W 72/12* | (2009.01) | |
| *H04W 84/04* | (2009.01) | |
| *H04W 84/10* | (2009.01) | |
| *H04W 84/12* | (2009.01) | |
| *H04W 88/16* | (2009.01) | |

(52) U.S. Cl.
CPC ......... *H04M 1/0202* (2013.01); *H04W 48/18* (2013.01); *H04W 72/10* (2013.01); *H04W 72/1226* (2013.01); *H04W 84/04* (2013.01); *H04W 84/10* (2013.01); *H04W 84/12* (2013.01); *H04W 88/10* (2013.01); *H04W 88/16* (2013.01)

(58) Field of Classification Search
CPC . H04W 72/1226; H04W 88/16; H04W 36/14; H04W 72/10; H04W 72/12; H04W 88/08; H04J 11/00; H04M 1/0202; H04M 1/02; H04M 2250/08; H04M 2250/00; H04M 2250/06; H04M 1/72; H04M 2215/00; H04M 1/72502; H04M 1/72505; H04M 3/42246; H04L 47/29; H04L 12/801
See application file for complete search history.

(56) References Cited

U.S. PATENT DOCUMENTS

| | | | |
|---|---|---|---|
| 2003/0069014 A1* | 4/2003 | Raffel et al. | 455/426 |
| 2005/0070272 A1* | 3/2005 | Marangos | 455/426.2 |
| 2006/0098627 A1* | 5/2006 | Karaoguz et al. | 370/352 |
| 2006/0286975 A1* | 12/2006 | Sugitani et al. | 455/426.1 |
| 2008/0031214 A1* | 2/2008 | Grayson et al. | 370/342 |
| 2008/0130555 A1 | 6/2008 | Kalhan | |
| 2009/0061850 A1 | 3/2009 | Li et al. | |
| 2009/0156188 A1* | 6/2009 | Bychkov | H04M 1/72513 455/417 |
| 2011/0122810 A1* | 5/2011 | Hodroj et al. | 370/328 |
| 2011/0206054 A1* | 8/2011 | Pajjuri et al. | 370/401 |
| 2011/0300879 A1* | 12/2011 | Braun | 455/456.1 |
| 2012/0023238 A1* | 1/2012 | Bouthemy et al. | 709/227 |
| 2013/0272277 A1* | 10/2013 | Suwa et al. | 370/336 |
| 2016/0150404 A1* | 5/2016 | Sugitani | H04W 12/04 |
| 2017/0019898 A1* | 1/2017 | Ishihara et al. | H04W 72/0453 |

* cited by examiner

COMMUNICATION SYSTEM FOR TRANSFERRING DATA BETWEEN DECT TERMINAL AND WIDE AREA WIRELESS BASE STATION

BACKGROUND

1. Technical Field

The present disclosure relates to a communication device that transfers data.

2. Description of the Related Art

There is wide use of a cordless phone system that includes a cordless phone master device provided indoors and a cordless slave device connected to the cordless phone master device. The Digital Enhanced Cordless Telecommunications (DECT) standard is adopted in such a cordless phone system for wireless communication between the cordless phone master device and the cordless phone slave device. Hereinafter, wireless communication that complies with the DECT standard will be referred to as "DECT communication". A link of DECT communication will be referred to as "DECT link". A terminal device that performs DECT communication will be referred to as "DECT terminal".

In recent years, there has been developed a cordless phone system that can be connected to a wireless local area network (LAN) (for example, Japanese Patent Unexamined Publication No. 2014-158191).

The long-term evolution (LTE) standard is adopted by the international standards organization called 3rd Generation Partnership Project (3GPP) for wireless communication between a mobile communication terminal and a base station. Hereinafter, wireless communication that complies with the LTE standard will be referred to as "LTE communication". A link of LTE communication will be referred to as "LTE link". A base station that performs LTE communication will be referred to as "LTE base station".

A communication system that uses both DECT communication and LTE communication did not exist heretofore.

SUMMARY

An object of the present disclosure is a provision of a communication device capable of transferring data between a DECT terminal and an LTE base station in order to build a communication system that uses both DECT communication and LTE communication.

According to an aspect of the present disclosure, there is provided a communication device including a DECT communication unit that performs DECT communication with a DECT terminal, and an LTE communication unit that transmits and receives data with the DECT communication unit and performs LTE communication with an LTE carrier gateway through an LTE base station, in which the DECT communication unit transmits a connection verification request to the LTE communication unit in order to verify a connection state of an LTE link with the LTE carrier gateway, the LTE communication unit transmits a connection verification response to the DECT communication unit in response to the connection verification request in a case where the LTE link is connected, and the DECT communication unit, in a case where the DECT communication unit receives a DECT connection request for requesting connection of a DECT link from the DECT terminal and receives the connection verification response from the LTE communication unit, transmits a DECT connection response to the DECT terminal in response to the DECT connection request.

According to the present disclosure, data can be transferred between the DECT terminal and the LTE base station, and a communication system that uses both DECT communication and LTE communication can be built.

DETAILED DESCRIPTION

Hereinafter, embodiments will be described in detail with appropriate reference to the drawings.

First Exemplary Embodiment

Configuration of Communication System

Figure 1:
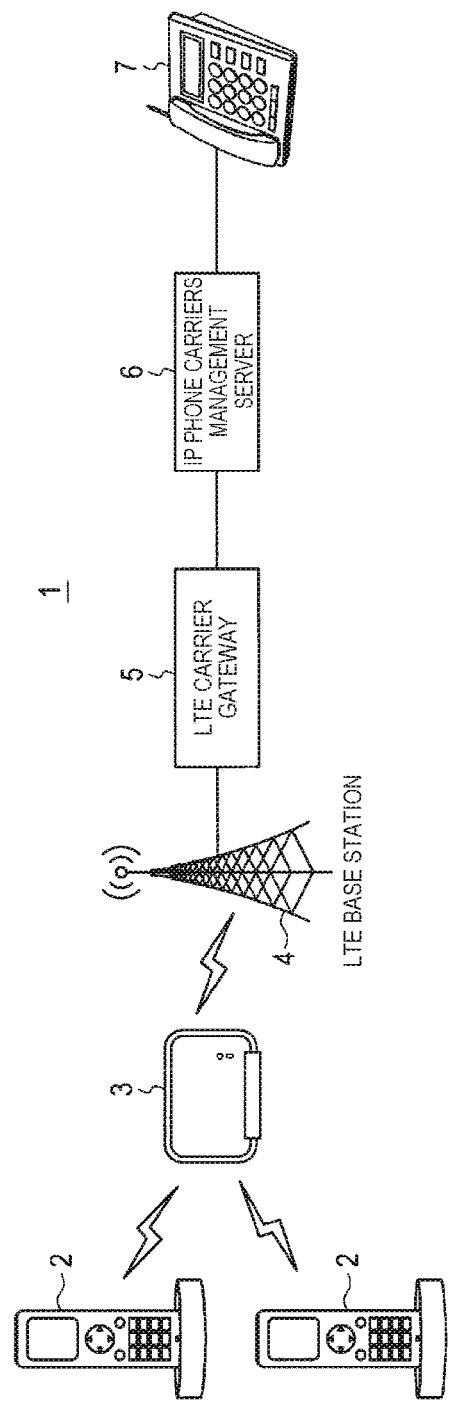
FIG. 1 is a block diagram illustrating a configuration of a communication system according to a first exemplary embodiment.

First, a configuration of communication system 1 according to a first exemplary embodiment will be described in detail by using FIG. 1.

Communication system 1 is mainly configured of handset 2, base unit 3, LTE base station 4, LTE carrier gateway 5, IP phone carriers management server 6, and IP phone 7.

Handset 2 that is a DECT terminal performs DECT communication with base unit 3. A detailed configuration of handset 2 will be described later.

Base unit 3 performs DECT communication with handset 2 and performs LTE communication with LTE base station 4. A detailed configuration of base unit 3 will be described later.

LTE base station 4 is connected to LTE carrier gateway 5 in a wired manner and performs LTE communication with base unit 3.

LTE carrier gateway 5 is connected to LTE base station 4 and IP phone carriers management server 6 in a wired manner.

IP phone carriers management server 6 is connected to LTE carrier gateway 5 and IP phone 7 in a wired manner.

IP phone 7 is connected to IP phone carriers management server 6 in a wired manner.

Configuration of Base Unit

Next, a configuration of base unit 3 according to the present exemplary embodiment will be described in detail by using FIG. 2.

Base unit 3 includes LTE communication unit 31 and DECT communication unit 32.

LTE communication unit 31 processes a received signal received from LTE base station 4 in a predetermined manner and outputs the processed received signal to DECT communication unit 32 using a method complying with the LTE standard. LTE communication unit 31 processes data input from DECT communication unit 32 in a predetermined manner and transmits the processed data to LTE base station 4 using a method complying with the LTE standard.

LTE communication unit 31 includes antenna 311, switching unit 312, filter 313, filter 314, low-noise amplifier (LNA) 315, amplifier 316, frequency conversion section 317, LTE baseband signal processing unit 318, and display unit 319.

Antenna 311 wirelessly transmits a signal to LTE base station 4 and receives a signal wirelessly transmitted from LTE base station 4.

Switching unit 312, in response to switching between transmission and reception, switches a destination to which antenna 311 is connected so as to connect antenna 311 and filter 313 upon reception and to connect antenna 311 and filter 314 upon transmission.

Filter 313 passes a signal of a predetermined frequency among received signals input through switching unit 312 from antenna 311 and outputs the signal of a predetermined frequency to LNA 315.

Filter 314 passes a signal of a predetermined frequency among transmitted signal input from amplifier 316 and outputs the signal of a predetermined frequency to antenna 311 through switching unit 312.

LNA 315 amplifies a received signal input from filter 313 and outputs the amplified received signal to frequency conversion section 317.

Amplifier 316 amplifies a modulated transmitted signal input from frequency conversion section 317 and outputs the amplified transmitted signal to filter 314.

Frequency conversion section 317 down-converts a received signal input from LNA 315 to a predetermined frequency and outputs the down-converted received signal to LTE baseband signal processing unit 318. Frequency conversion section 317 up-converts a transmitted signal input from LTE baseband signal processing unit 318 to a predetermined frequency and outputs the up-converted transmitted signal to amplifier 316.

LTE baseband signal processing unit 318 performs baseband signal processing, such as demodulation and decoding, of a received signal input from frequency conversion section 317 and thereby generates received data and outputs the received data to DECT baseband signal processing unit 321. LTE baseband signal processing unit 318 performs baseband signal processing, such as encoding and modulation, of transmitted data input from DECT baseband signal processing unit 321 by inserting a control signal to the transmitted data and thereby generates a transmitted signal and outputs the transmitted signal to frequency conversion section 317. LTE baseband signal processing unit 318 controls display unit 319 to display various types of information such as a reception level.

Display unit 319 displays various types of information such as a reception level under control of LTE baseband signal processing unit 318.

DECT communication unit 32 processes a received signal received from handset 2 (DECT terminal) in a predetermined manner and outputs the processed received signal to LTE communication unit 31 using a method complying with the DECT standard. DECT communication unit 32 processes data input from LTE communication unit 31 in a predetermined manner and transmits the processed data to handset 2 using a method complying with the DECT standard.

DECT communication unit 32 includes DECT baseband signal processing unit 321, frequency conversion section 322, LNA 323, amplifier 324, filter 325, filter 326, switching unit 327, and antenna 328.

DECT baseband signal processing unit 321 performs baseband signal processing, such as demodulation and decoding, of a received signal input from frequency conversion section 322 and thereby generates received data and outputs the received data to LTE baseband signal processing unit 318. DECT baseband signal processing unit 321 performs baseband signal processing, such as encoding and modulation, of transmitted data input from LTE baseband signal processing unit 318 by inserting a control signal to the transmitted data and thereby generates a transmitted signal and outputs the transmitted signal to frequency conversion section 322.

Frequency conversion section 322 down-converts a received signal input from LNA 323 to a predetermined frequency and outputs the down-converted received signal to DECT baseband signal processing unit 321. Frequency conversion section 322 up-converts a transmitted signal input from DECT baseband signal processing unit 321 and outputs the up-converted transmitted signal to amplifier 324.

LNA 323 amplifies a received signal input from filter 325 and outputs the amplified received signal to frequency conversion section 322.

Amplifier 324 amplifies a modulated transmitted signal input from frequency conversion section 322 and outputs the amplified transmitted signal to filter 326.

Filter 325 passes a signal of a predetermined frequency among received signals input through switching unit 327 from antenna 328 and outputs the signal of a predetermined frequency to LNA 323.

Filter 326 passes a signal of a predetermined frequency among transmitted signal input from amplifier 324 and outputs the signal of a predetermined frequency to antenna 328 through switching unit 327.

Switching unit 327, in response to switching between transmission and reception, switches a destination to which antenna 328 is connected so as to connect antenna 328 and filter 325 upon reception and to connect antenna 328 and filter 326 upon transmission.

Antenna 328 wirelessly transmits a signal to handset 2 and receives a signal wirelessly transmitted from handset 2.

Configuration of Handset

Figure 3:
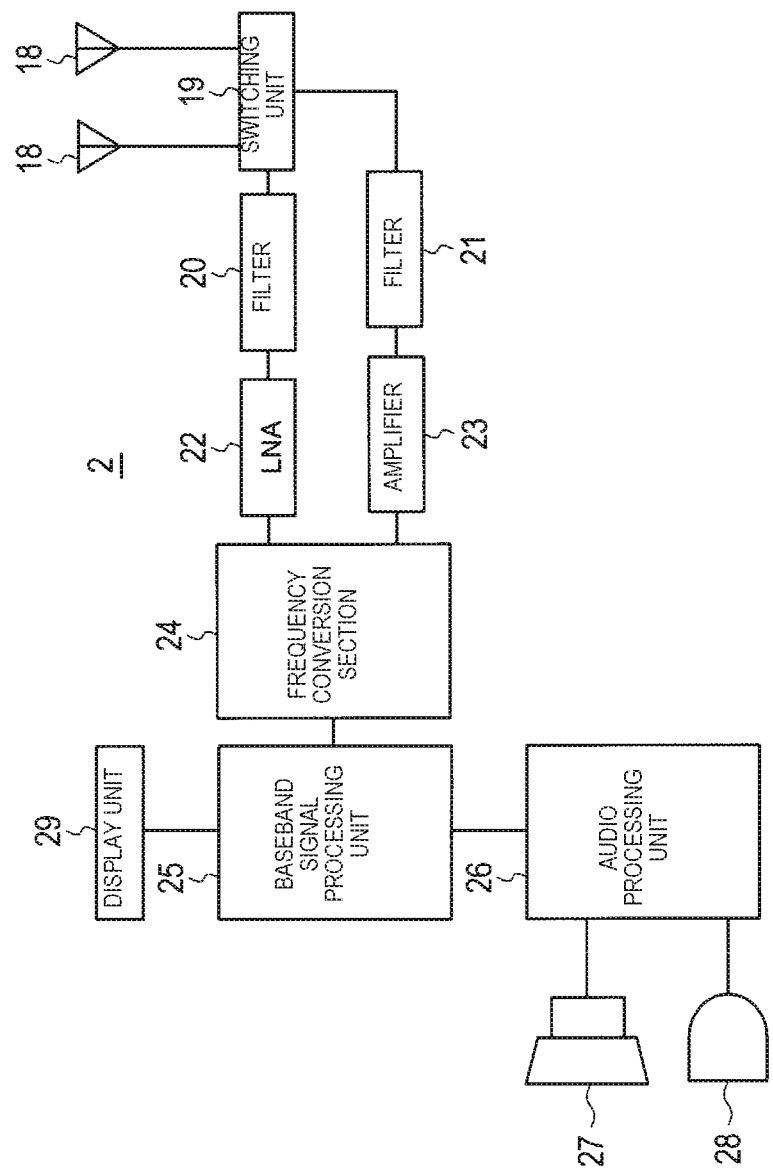
FIG. 3 is a block diagram illustrating a configuration of a handset according to the first exemplary embodiment.

Next, a configuration of handset 2 according to the present exemplary embodiment will be described in detail by using FIG. 3.

Handset 2 includes antenna 18, switching unit 19, filter 20, filter 21, LNA 22, amplifier 23, frequency conversion section 24, baseband signal processing unit 25, audio processing unit 26, loudspeaker 27, microphone 28, and display unit 29.

Antenna 18 wirelessly transmits a signal to base unit 3 and receives a signal wirelessly transmitted from base unit 3.

Switching unit 19, in response to switching between transmission and reception, switches a destination to which antenna 18 is connected so as to connect antenna 18 and filter 20 upon reception and to connect antenna 18 and filter 21 upon transmission.

Filter 20 passes a signal of a predetermined frequency among received signals input through switching unit 19 from antenna 18 and outputs the signal of a predetermined frequency to LNA 22.

Filter 21 passes a signal of a predetermined frequency among transmitted signal input from amplifier 23 and outputs the signal of a predetermined frequency to antenna 18 through switching unit 19.

LNA 22 amplifies a received signal input from filter 20 and outputs the amplified received signal to frequency conversion section 24.

Amplifier 23 amplifies a modulated transmitted signal input from frequency conversion section 24 and outputs the amplified transmitted signal to filter 21.

Frequency conversion section 24 down-converts a received signal input from LNA 22 to a predetermined frequency and outputs the down-converted received signal to baseband signal processing unit 25. Frequency conversion section 24 up-converts a transmitted signal input from baseband signal processing unit 25 and outputs the up-converted transmitted signal to amplifier 23.

Baseband signal processing unit 25 performs baseband signal processing, such as demodulation and decoding, of a received signal input from frequency conversion section 24 and thereby generates audio data and outputs the audio data to audio processing unit 26. Baseband signal processing unit 25 performs baseband signal processing, such as encoding and modulation, of audio data input from audio processing unit 26 by inserting a control signal to the audio data and thereby generates a transmitted signal and outputs the transmitted signal to frequency conversion section 24. Baseband signal processing unit 25 controls display unit 29 to display various types of information such as a reception level.

Audio processing unit 26 performs audio processing of audio data input from baseband signal processing unit 25 and thereby causes audio to be output from loudspeaker 27. Audio processing unit 26 performs audio processing that converts audio input through microphone 28 into audio data and outputs the audio data to baseband signal processing unit 25.

Display unit 29 displays various types of information such as a reception level under control of baseband signal processing unit 25.

Operation of Communication System from Booting Thereof Until LTE Link is Connected Next, operation of communication system 1 according to the present exemplary embodiment from booting of base unit 3 until an LTE link is connected will be described in detail by using FIG. 4.

First, base unit 3 is booted, and operation thereof is initiated. At this point, handset 2 causes display unit 29 to display character information "No DECT Connection" in order to provide a notification that a DECT link is not yet connected.

When base unit 3 is booted, DECT communication unit 32 repeatedly transmits a connection verification request signal to LTE communication unit 31 in Step S31 in order to verify the connection state between LTE communication unit 31 and LTE carrier gateway 5.

In this state, when handset 2 transmits a DECT registration request signal to DECT communication unit 32 in Step S32, DECT communication unit 32 performs a DECT registration process. When the DECT registration process is completed, DECT communication unit 32 transmits a DECT registration response signal to handset 2 in Step S33. At this point, since base unit 3 is not yet connected to an LTE base station, handset 2 causes display unit 29 to display character information "No LTE Connection" in order to provide a notification that an LTE link is not yet connected.

When LTE communication unit 31 transmits an LTE connection request signal to LTE carrier gateway 5 through LTE base station 4 in Step S34, LTE carrier gateway 5 performs an LTE connection process. When the LTE connection process is completed, LTE carrier gateway 5 transmits an LTE connection response signal to LTE communication unit 31 through LTE base station 4 in Step S35. Accordingly, a persistent connection is made between LTE communication unit 31 and LTE carrier gateway 5.

When DECT communication unit 32 transmits a connection verification request signal to LTE communication unit 31 in Step S31 after a persistent connection is made between LTE communication unit 31 and LTE carrier gateway 5, LTE communication unit 31 transmits a connection verification response signal to DECT communication unit 32 in Step S36.

When DECT communication unit 32 transmits an SIP registration request signal to IP phone carriers management server 6 through LTE communication unit 31, LTE base station 4, and LTE carrier gateway 5 in Step S37 after DECT communication unit 32 receives the connection verification response signal, IP phone carriers management server 6 performs an SIP registration process. When the SIP registration process is completed, IP phone carriers management server 6 transmits an SIP registration response signal to DECT communication unit 32 through LTE carrier gateway 5, LTE base station 4, and LTE communication unit 31 in Step S38.

DECT communication unit 32 transmits a state notification signal to handset 2 in Step S39 after DECT communication unit 32 receives the SIP registration response signal. Accordingly, handset 2 causes display unit 29 to display character information "standby" in order to provide a notification that handset 2 is on standby.

Operation of Communication System after LTE Link is Connected

Figure 5:
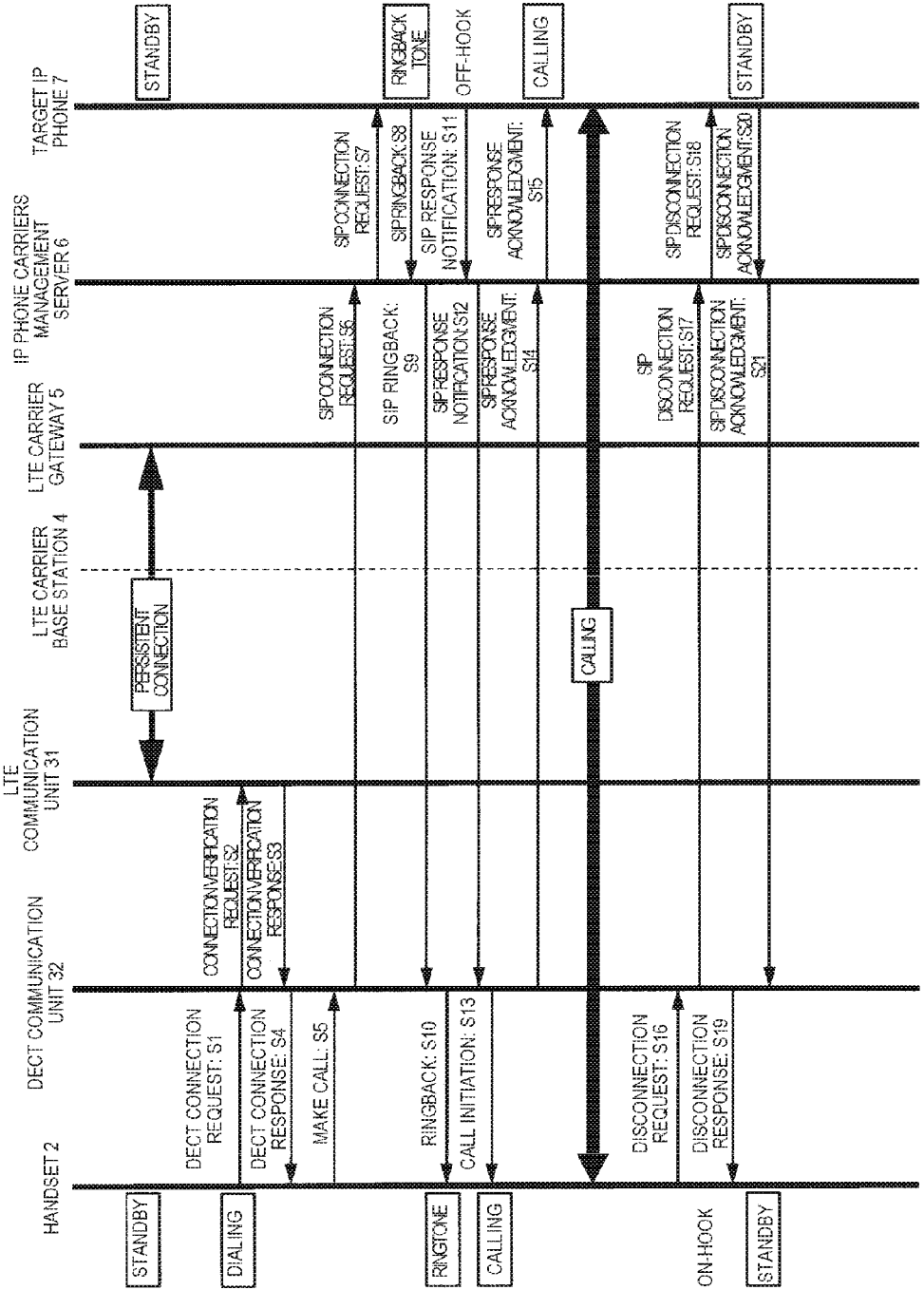
FIG. 5 is a sequence diagram illustrating operation of the communication system according to the first exemplary embodiment after an LTE link is connected.

Next, operation of communication system 1 according to the present exemplary embodiment after an LTE link is connected for base unit 3 will be described in detail by using FIG. 5.

First, handset 2 and IP phone 7 are on standby before a communication is initiated. In addition, a persistent connection is made between LTE communication unit 31 of base unit 3 and LTE carrier gateway 5 through LTE base station 4.

A user of handset 2 performs a "dialing" operation, thereby causing handset 2 to transmit a DECT connection request signal to DECT communication unit 32 of base unit 3 in Step S1. At this point, handset 2 causes display unit 29 to display character information "dialing".

DECT communication unit 32 transmits a connection verification request signal to LTE communication unit 31 in Step S2. The connection verification request signal transmitted in Step S2 of FIG. 5 is the same signal as the connection verification request signal transmitted in Step S31 of FIG. 4 and, though not illustrated in FIG. 5, is repeatedly transmitted in the same manner as in FIG. 4.

When LTE communication unit 31 receives the connection verification request signal, LTE communication unit 31 verifies whether or not LTE communication unit 31 is connected to LTE carrier gateway 5. LTE communication unit 31 transmits a connection verification response signal to DECT communication unit 32 in Step S3 in a case where LTE communication unit 31 is connected to LTE carrier gateway 5. The connection verification response signal transmitted in Step S3 of FIG. 5 is the same signal as the connection verification response signal transmitted in Step S36 of FIG. 4 and, though not illustrated in FIG. 5, is repeatedly transmitted in the same manner as in FIG. 4.

When DECT communication unit 32 receives the connection verification response signal in a state where an LTE link is connected, DECT communication unit 32 transmits a DECT connection response signal to handset 2 in Step S4.

Then, handset 2 makes a call, and thereby handset 2 transmits a call signal to DECT communication unit 32 in Step S5. DECT communication unit 32 transmits an SIP connection request signal to IP phone carriers management server 6 through LTE communication unit 31, LTE base station 4, and LTE carrier gateway 5 in step S6. IP phone carriers management server 6 transmits an SIP connection request signal to IP phone 7 in Step S7, and IP phone 7 outputs a ringtone.

While the ringtone is output, IP phone 7 transmits an SIP ringback signal to IP phone carriers management server 6 in Step S8. IP phone carriers management server 6 transmits an SIP ringback signal to DECT communication unit 32 through LTE carrier gateway 5, LTE base station 4, and LTE communication unit 31 in Step S9. DECT communication unit 32 transmits a ringback signal to handset 2 in Step S10, and handset 2 outputs a ringback tone.

When a user of IP phone 7 performs a call initiation operation (off-hook operation), IP phone 7 transmits an SIP response notification signal to IP phone carriers management server 6 in Step S11. IP phone carriers management server 6 transmits an SIP response notification signal to DECT communication unit 32 through LTE carrier gateway 5, LTE base station 4, and LTE communication unit 31 in Step S12. DECT communication unit 32 transmits a call initiation signal to handset 2 in Step S13. At this point, handset 2 causes display unit 29 to display character information "calling".

DECT communication unit 32 transmits an SIP response acknowledgment signal to IP phone carriers management server 6 through LTE communication unit 31, LTE base station 4, and LTE carrier gateway 5 in Step S14. IP phone carriers management server 6 transmits an SIP response acknowledgment signal to IP phone 7 in Step S15. At this point, IP phone 7 displays character information "calling" on a screen. Accordingly, a link is connected between handset 2 and IP phone 7, and a call can be made.

Then, the user of handset 2 performs a call termination operation (on-hook operation), and thereby handset 2 transmits a disconnection request signal to DECT communication unit 32 in Step S16. DECT communication unit 32 transmits an SIP disconnection request signal to IP phone carriers management server 6 through LTE communication unit 31, LTE base station 4, and LTE carrier gateway 5 in Step S17. IP phone carriers management server 6 transmits an SIP disconnection request signal to IP phone 7 in Step S18.

Accordingly, the link between handset 2 and IP phone 7 is disconnected, and IP phone 7 is placed on standby and displays character information "standby" on the screen.

DECT communication unit 32 transmits a disconnection response signal to handset 2 in Step S19 along with Step S17, and handset 2 is placed on standby and causes display unit 29 to display character information "standby".

IP phone 7 transmits an SIP disconnection acknowledgment signal to IP phone carriers management server 6 in Step S20 after Step S18. IP phone carriers management server 6 transmits an SIP disconnection acknowledgment signal to DECT communication unit 32 through LTE carrier gateway 5, LTE base station 4, and LTE communication unit 31 in Step S21.

Reconnection Operation of Communication System

Figure 6:
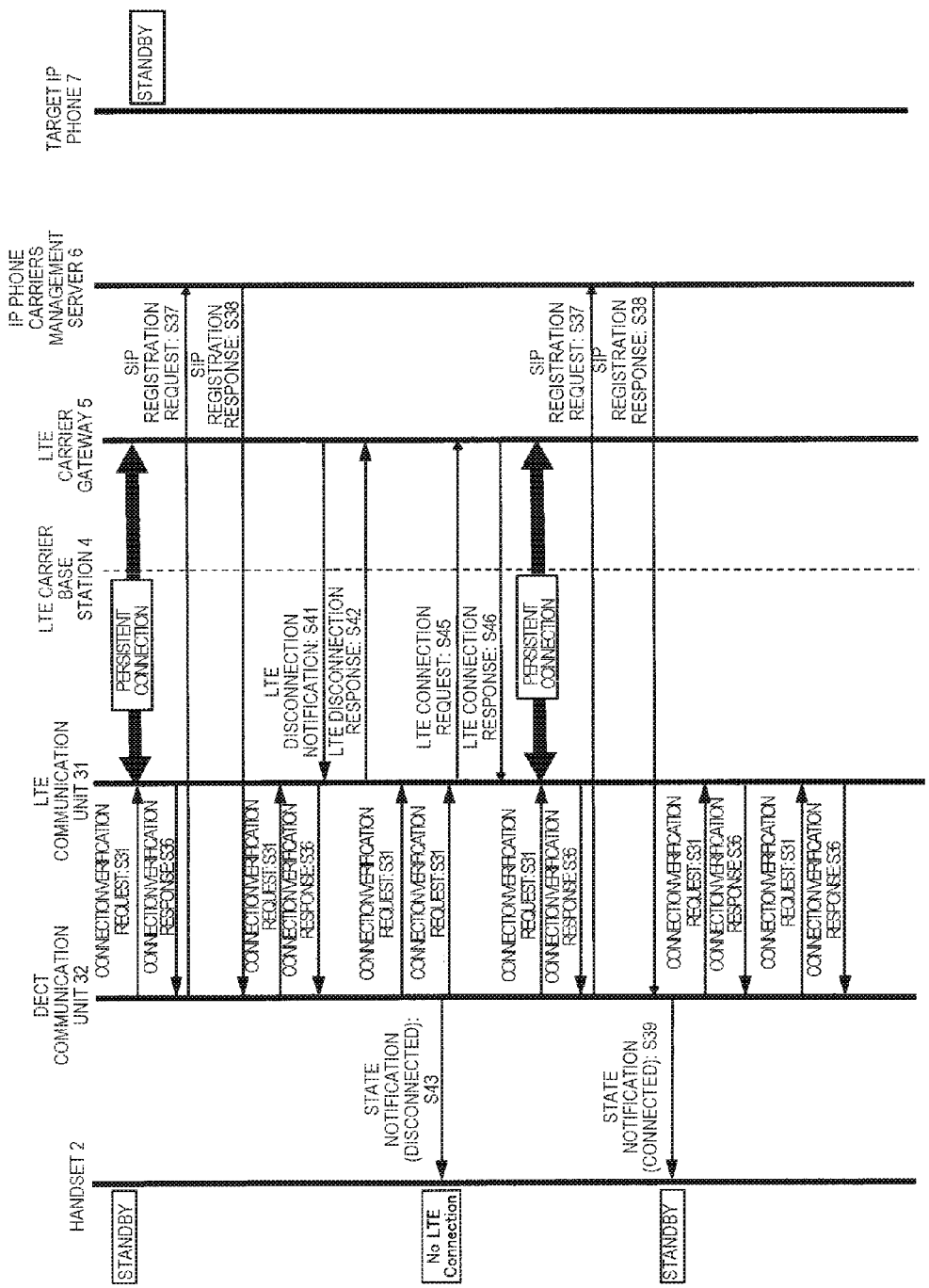
FIG. 6 is a sequence diagram illustrating a reconnection operation of the communication system according to the first exemplary embodiment.

Next, a reconnection operation of communication system 1 according to the present exemplary embodiment will be described in detail by using FIG. 6. The same part of the operation as in FIG. 4 will be designated by the same reference sign in FIG. 6 and will not be described.

Assume that an LTE link is required to be disconnected by some reason in a state where LTE communication unit 31 is connected to LTE carrier gateway 5 through LTE base station 4.

In this case, first, LTE carrier gateway 5 transmits an LTE disconnection notification signal to LTE communication unit 31 through LTE base station 4 in Step S41. LTE communication unit 31 transmits an LTE disconnection response signal to LTE carrier gateway 5 through LTE base station 4 in Step S42, and the LTE link is disconnected.

In this state, when DECT communication unit 32 transmits a connection verification request signal to LTE communication unit 31 in Step S31, LTE communication unit 31 does not transmit a connection verification response signal to DECT communication unit 32. Accordingly, DECT communication unit 32 can recognize that the LTE link is disconnected.

DECT communication unit 32 transmits a state notification signal that indicates the disconnection of the LTE link to handset 2 in Step S43. Accordingly, handset 2 displays character information "No LTE Connection" in order to provide a notification that an LTE link is not yet connected.

Figure 4:
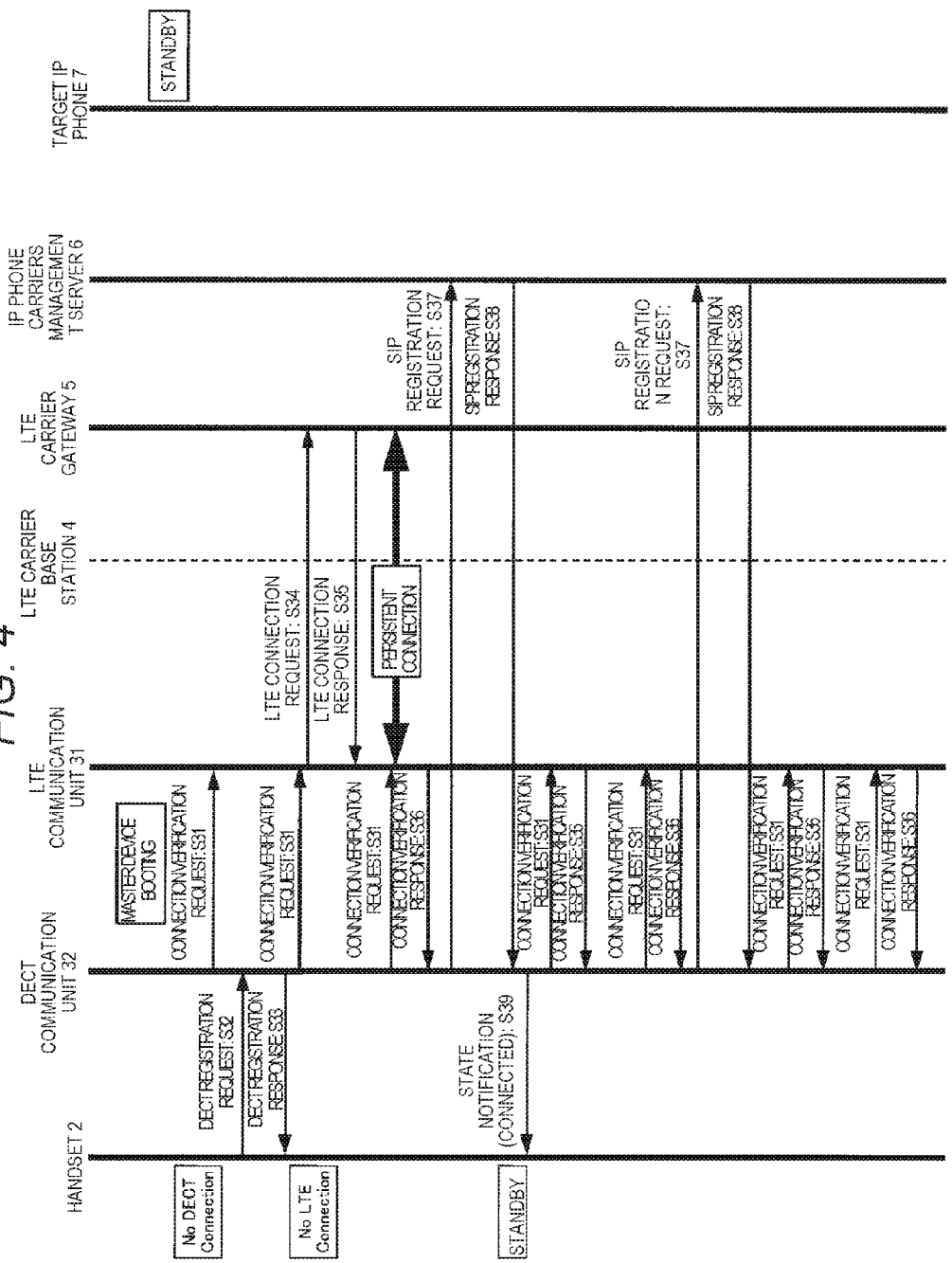
FIG. 4 is a sequence diagram illustrating operation of the communication system according to the first exemplary embodiment from booting thereof until an LTE link is connected.

Then, the same operation as in FIG. 4 is performed, such that DECT communication unit 32 transmits a connection verification request signal to LTE communication unit 31.

Effect

According to the present exemplary embodiment described heretofore, DECT communication unit 32 transmits a DECT connection response to a DECT terminal in a case where DECT communication unit 32 receives a DECT connection request from handset 2 (DECT terminal) in a state where an LTE link is connected. Accordingly, since a call from a DECT terminal can be received only in a state where an LTE link is connected, data can be transferred between the DECT terminal and an LTE base station, and a communication system that uses both DECT communication and LTE communication can be built.

Second Exemplary Embodiment

Summary

In an over-the-top VoIP connection, transmission and reception of audio data having been subjected to RTP protocol processing may be failed in a case where the radio wave condition is degraded, even though transmission and reception of an SIP call control message is succeeded. In this case, audio is muted. A certain or higher level of communication quality is required to be secured in order to avoid such a state.

In view of this point, a second exemplary embodiment will be described in a case where base unit 3 notifies handset 2 of the radio wave condition. Configurations of a communication system and each device of the present exemplary embodiment, operation from booting until an LTE link is connected, and reconnection operation are the same as those of the first exemplary embodiment and thus will not be described.

Operation of Communication System after LTE Link is Connected

Figure 7:
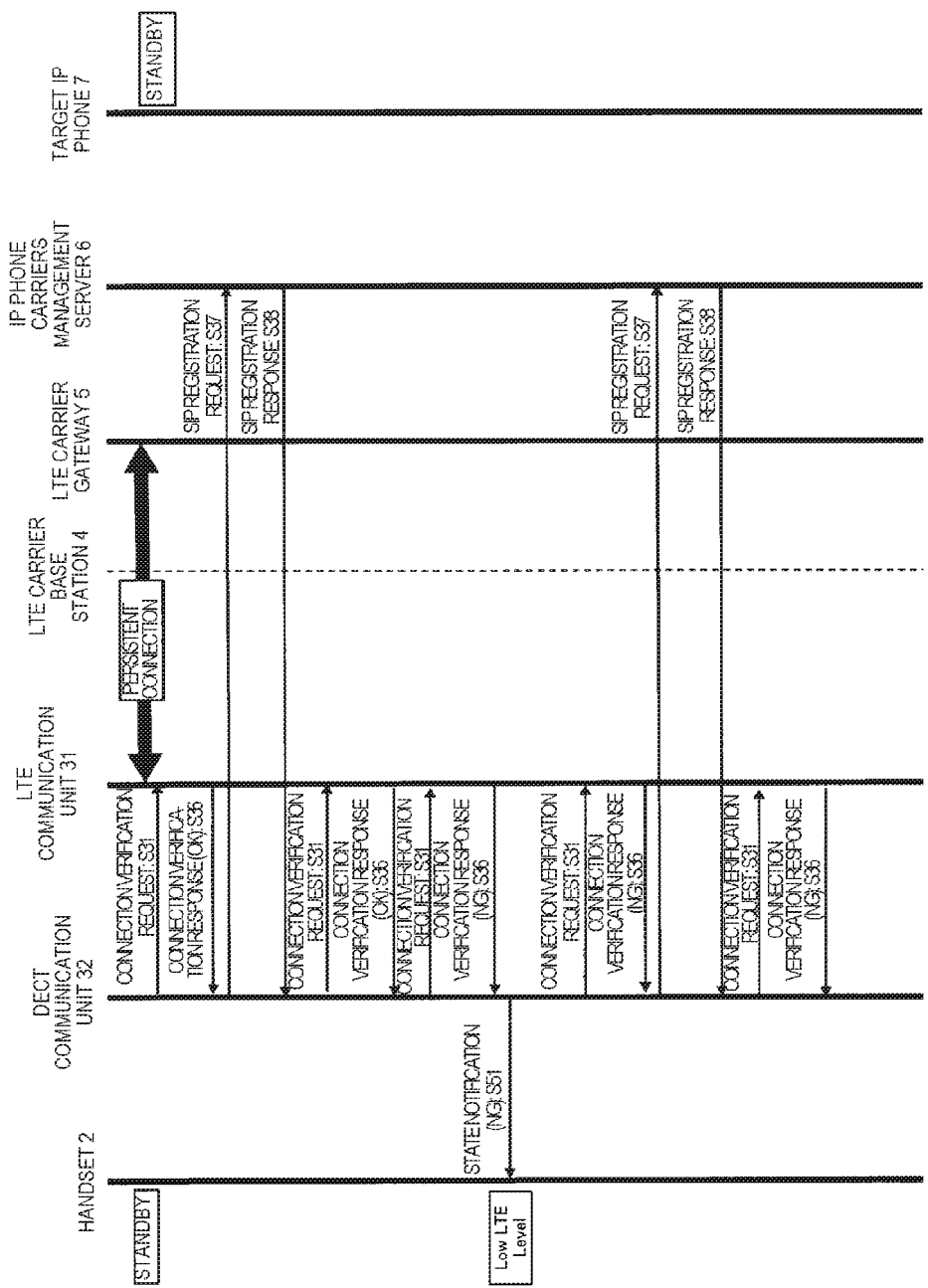
FIG. 7 is a sequence diagram illustrating operation of a communication system according to a second exemplary embodiment after an LTE link is connected.

Hereinafter, operation of communication system 1 according to the present exemplary embodiment after an LTE link is connected will be described in detail by using FIG. 7. The same part of the operation as in FIG. 6 will be designated by the same reference sign in FIG. 7 and will not be described.

When LTE communication unit 31 receives a connection verification request signal (Step S31) in a state where a persistent connection is made between LTE communication unit 31 and LTE carrier gateway 5 through LTE base station 4, LTE communication unit 31 (LTE baseband signal processing unit 318) determines the radio wave condition on the LTE link in the present exemplary embodiment.

Specifically, LTE communication unit 31 measures the level of electric fields or a bit error rate and determines whether the radio wave condition is good or degraded on the basis of the measurement result. In a case of measuring the level of electric fields, LTE communication unit 31 determines the radio wave condition to be good in a case where the level of electric fields is greater than or equal to a threshold and determines the radio wave condition to be degraded in a case where the level of electric fields is smaller than the threshold. In a case of measuring the bit error rate, LTE communication unit 31 determines the radio wave condition to be good in a case where the bit error rate is smaller than a threshold and determines the radio wave condition to be degraded in a case where the bit error rate is greater than or equal to the threshold.

LTE communication unit 31, when transmitting a connection verification response signal to DECT communication unit 32 in Step S36, includes information indicating the result of determination of the radio wave condition in the connection verification response signal.

Communication system 1 according to the present exemplary embodiment performs the same operation as in the first exemplary embodiment in a case where the radio wave condition is good.

Meanwhile, in a case where the radio wave condition is degraded, DECT communication unit 32 transmits a state notification signal that indicates the degradation of the radio wave condition (NG) to handset 2 in Step S51. Accordingly, handset 2 (baseband signal processing unit 25) causes display unit 29 to display character information "Low LTE Level" in order to provide a notification that the radio wave condition is degraded. At this point, handset 2 does not perform a "dialing" operation, if performed by the user, and does not perform call making and receiving operations.

Display unit 319 of base unit 3 typically displays an antenna in red color using a pictorial display of an antenna in a case where the radio wave condition is degraded.

Effect

According to the present exemplary embodiment described heretofore, LTE communication unit 31 of base unit 3 measures the radio wave condition on an LTE link, notifies handset 2 of the radio wave condition, and stops call making and receiving operations. Accordingly, it is possible to avoid a state where audio is muted. In addition, since handset 2 can be notified of the degradations of the radio wave condition, handset 2 can prompt the user thereof to move to a place where the radio wave condition is good and can contribute to releasing a stoppage of call making and receiving operations.

While the present exemplary embodiment is described in a case where the information indicating the result of determination of the radio wave condition is included in a connection verification response signal, the present disclosure is not limited thereto. The information indicating the result of determination of the radio wave condition may be included in a separate signal from the connection verification response signal, and LTE communication unit 31 may transmit the signal to DECT communication unit 32.

While the present exemplary embodiment is described in a case where display unit 29 displays character information "Low LTE Level" if the radio wave condition is degraded, the present disclosure is not limited thereto. Display unit 29, if the radio wave condition is degraded, may display character information different from the character information displayed in a case where an LTE link is not yet connected and the character information displayed in a case where a DECT link is not yet connected.

Third Exemplary Embodiment

Configuration of Communication System

Figure 8:
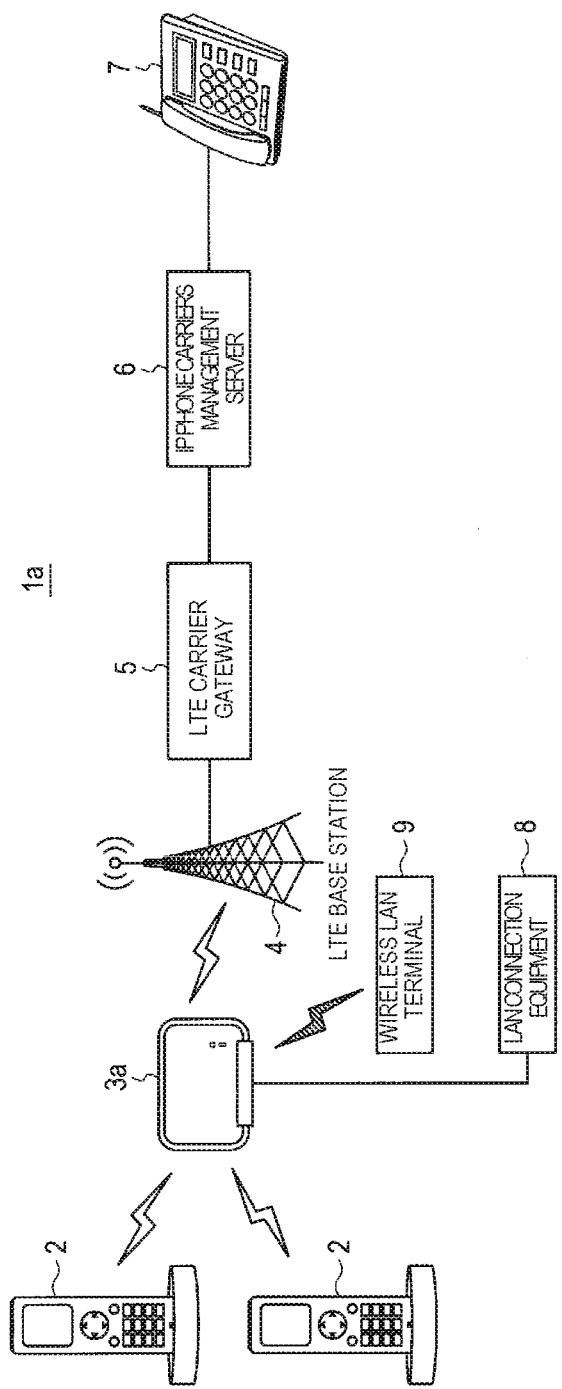
FIG. 8 is a block diagram illustrating a configuration of a communication system according to a third exemplary embodiment.

Next, a configuration of communication system 1a according to a third exemplary embodiment will be described in detail by using FIG. 8. The same part of the configuration as in FIG. 1 will be designated by the same reference sign in FIG. 8 and will not be described.

Communication system 1a includes handset 2, base unit 3a, LTE base station 4, LTE carrier gateway 5, IP phone carriers management server 6, IP phone 7, LAN connection equipment 8, and wireless LAN terminal 9.

Base unit 3a performs DECT communication with handset 2, performs LTE communication with LTE base station 4, and performs wireless LAN communication with LAN connection equipment 8. Base unit 3a is connected to LAN connection equipment 8 in a wired manner. Wireless LAN terminal 9 is typically a smartphone or a personal computer. LAN connection equipment 8 is typically a personal computer.

Configuration of Base Unit

Next, a configuration of base unit 3a according to the present exemplary embodiment will be described in detail by using FIG. 9. The same part of the configuration as in FIG. 2 will be designated by the same reference sign in FIG. 9 and will not be described.

Figure 2:
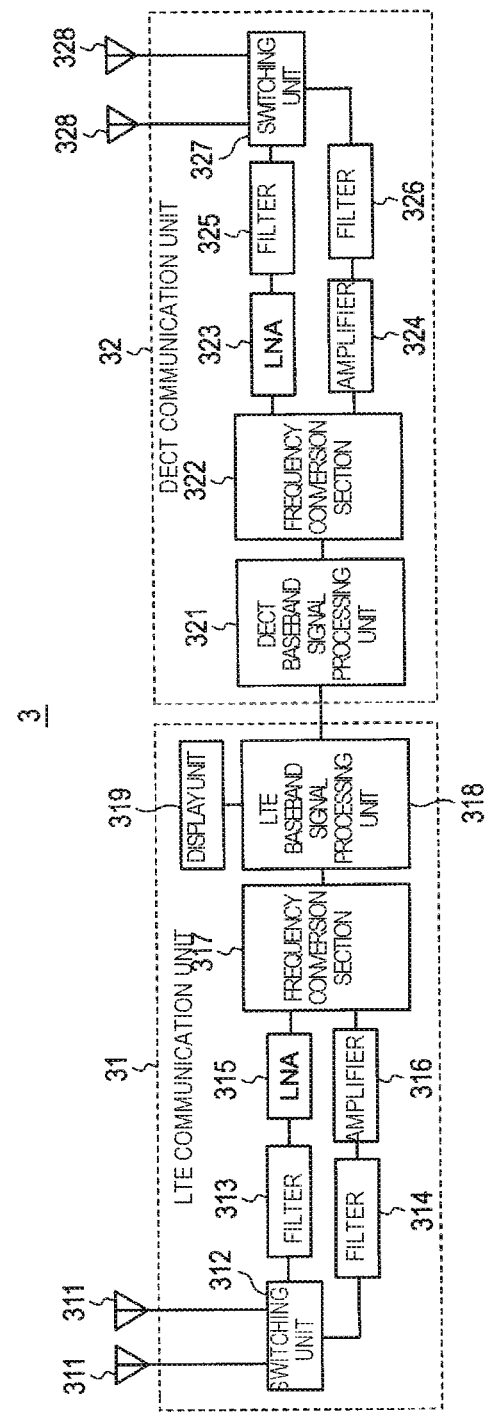
FIG. 2 is a block diagram illustrating a configuration of a base unit according to the first exemplary embodiment.
Figure 9:
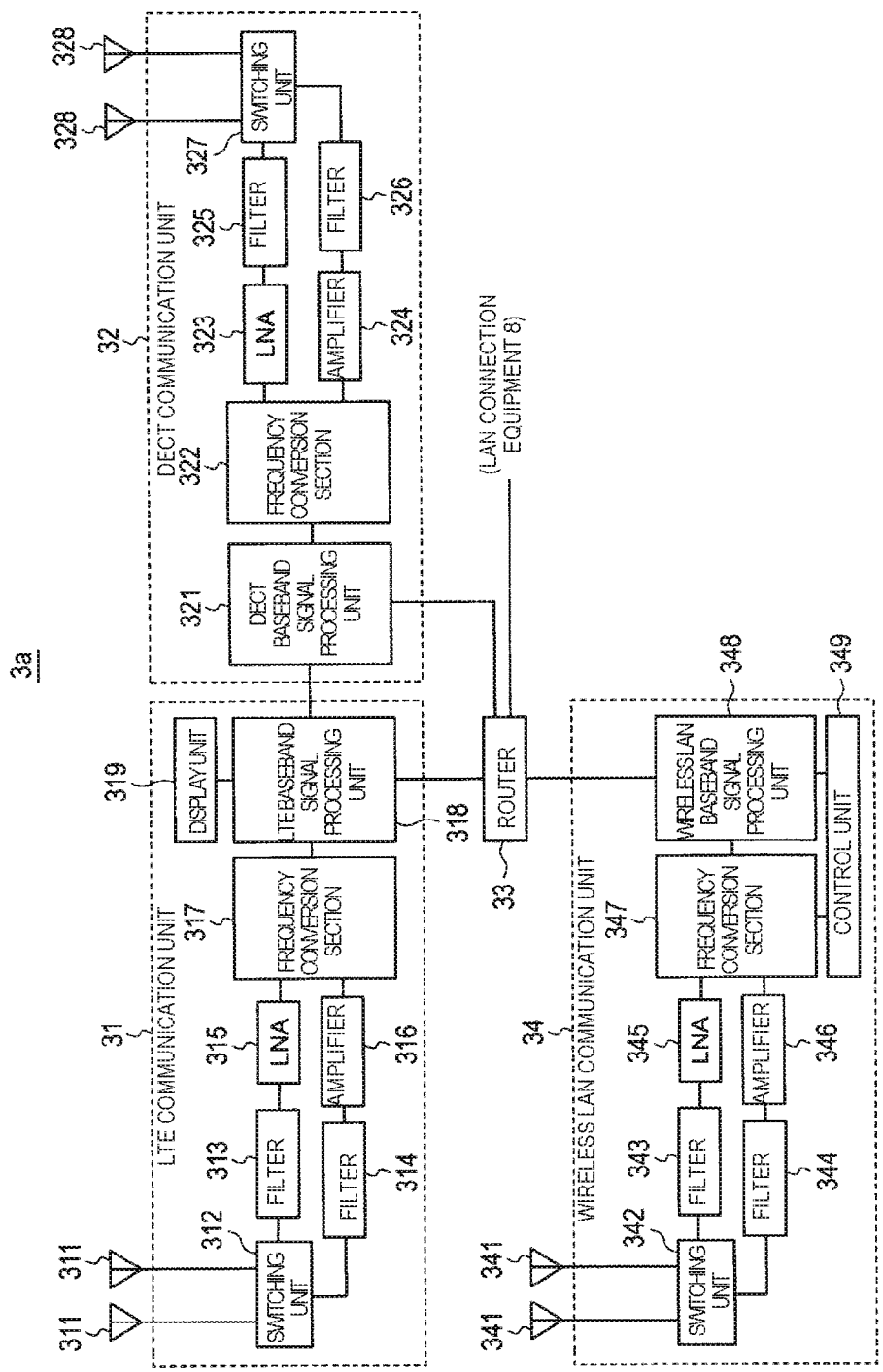
FIG. 9 is a block diagram illustrating a configuration of a base unit according to the third exemplary embodiment.

Base unit 3a illustrated in FIG. 9 employs a configuration of base unit 3 illustrated in FIG. 2 to which router 33 and wireless LAN communication unit 34 are added. LTE communication unit 31 and DECT communication unit 32 transmit and receive data with each other through router 33 in base unit 3a illustrated in FIG. 9.

LTE baseband signal processing unit 318 performs baseband signal processing, such as demodulation and decoding, of a received signal input from frequency conversion section 317 and thereby generates received data and outputs the received data to router 33. LTE baseband signal processing unit 318 performs baseband signal processing, such as encoding and modulation, of transmitted data input from router 33 and thereby generates a transmitted signal and outputs the transmitted signal to frequency conversion section 317.

DECT baseband signal processing unit 321 performs baseband signal processing, such as demodulation and decoding, of a received signal input from frequency conversion section 322 and thereby generates received data and outputs the received data to router 33. DECT baseband signal processing unit 321 performs baseband signal processing, such as encoding and modulation, of transmitted data input from router 33 and thereby generates a transmitted signal and outputs the transmitted signal to frequency conversion section 322.

Router 33 mediates data transfer among LTE baseband signal processing unit 318, DECT baseband signal processing unit 321, wireless LAN baseband signal processing unit 348, and LAN connection equipment 8. Specifically, router 33 outputs the received data (packet) input from LTE baseband signal processing unit 318 to DECT baseband signal processing unit 321, wireless LAN baseband signal processing unit 348, or LAN connection equipment 8. Router 33 outputs the received data input from DECT baseband signal processing unit 321, the received data input from wireless LAN baseband signal processing unit 348, or the received data input from LAN connection equipment 8 to LTE baseband signal processing unit 318.

At this point, router 33 performs the process of outputting the received data (audio communication packet) input from LTE baseband signal processing unit 318 to DECT baseband signal processing unit 321 and the process of outputting the received data (audio communication packet) input from DECT baseband signal processing unit 321 to LTE baseband signal processing unit 318 with higher priority than other processes. In other words, router 33 performs data transfer for audio communication between LTE communication unit 31 and DECT communication unit 32 with higher priority than data transfer for data communication between LTE communication unit 31 and wireless LAN communication unit 34 or than data transfer for data communication between LTE communication unit 31 and LAN connection equipment 8.

Wireless LAN communication unit 34 processes a received signal received from wireless LAN terminal 9 in a predetermined manner and outputs the processed received signal to router 33. Wireless LAN communication unit 34 processes data input from router 33 in a predetermined manner and transmits the processed data to wireless LAN terminal 9.

Wireless LAN communication unit 34 includes antenna 341, switching unit 342, filter 343, filter 344, LNA 345, amplifier 346, frequency conversion section 347, wireless LAN baseband signal processing unit 348, and control unit 349.

Antenna 341 wirelessly transmits a signal to wireless LAN terminal 9 and receives a signal wirelessly transmitted from wireless LAN terminal 9.

Switching unit 342, in response to switching between transmission and reception, switches a destination to which antenna 341 is connected so as to connect antenna 341 and filter 343 upon reception and to connect antenna 341 and filter 344 upon transmission.

Filter 343 passes a signal of a predetermined frequency among received signals input through switching unit 342 from antenna 341 and outputs the signal of a predetermined frequency to LNA 345.

Filter 344 passes a signal of a predetermined frequency among transmitted signal input from amplifier 346 and outputs the signal of a predetermined frequency to antenna 341 through switching unit 342.

LNA 345 amplifies a received signal input from filter 343 and outputs the amplified received signal to frequency conversion section 347.

Amplifier 346 amplifies a modulated transmitted signal input from frequency conversion section 347 and outputs the amplified transmitted signal to filter 344.

Frequency conversion section 347 down-converts a received signal input from LNA 345 to a predetermined frequency and outputs the down-converted received signal to wireless LAN baseband signal processing unit 348. Frequency conversion section 347 up-converts a transmitted signal input from wireless LAN baseband signal processing unit 348 to a predetermined frequency and outputs the up-converted transmitted signal to amplifier 346.

Wireless LAN baseband signal processing unit 348 performs baseband signal processing, such as demodulation and decoding, of a received signal input from frequency conversion section 347 and thereby generates received data and outputs the received data to router 33. Wireless LAN baseband signal processing unit 348 performs baseband signal processing, such as encoding and modulation, of transmitted data input from router 33 by inserting a control signal to the transmitted data and thereby generates a transmitted signal and outputs the transmitted signal to frequency conversion section 347.

Control unit 349 controls operation of frequency conversion section 347 and wireless LAN baseband signal processing unit 348.

Operation of communication system 1a is the same as illustrated in FIG. 4 to FIG. 7 and thus will not be described.

Effect

According to the present exemplary embodiment, a communication system that uses both DECT communication and LAN communication can be built in addition to the effects of the first and second exemplary embodiments. In addition, a delay can be reduced in audio communication that requires immediate responsiveness, by router 33 performing data transfer for audio communication between LTE communication unit 31 and DECT communication unit 32 with higher priority.

Fourth Exemplary Embodiment

Summary

Figure 10:
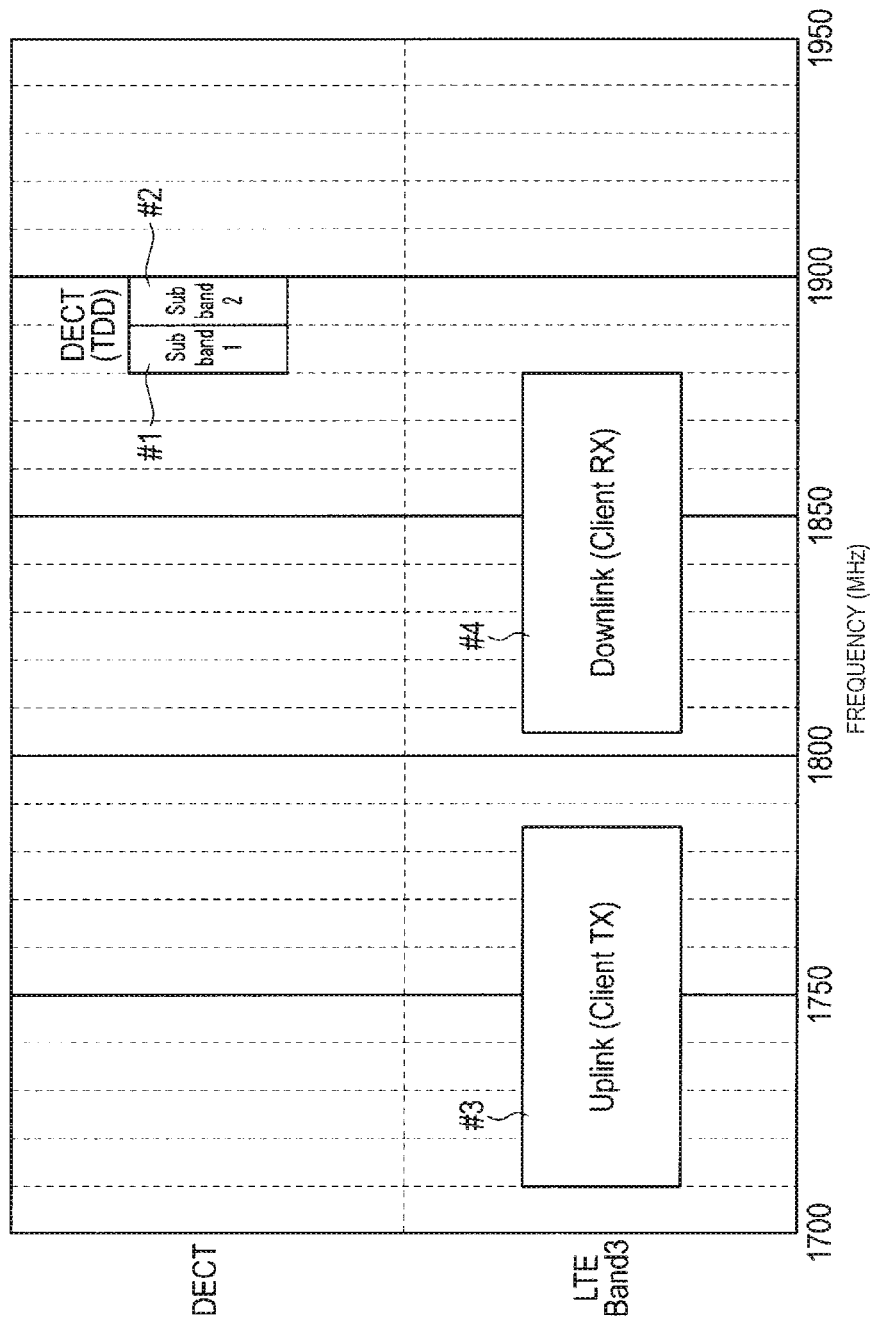
FIG. 10 is a diagram illustrating frequencies used by a communication system according to a fourth exemplary embodiment.

In DECT communication, transmission and reception of data is performed in accordance with time-division multiplexing by using one of pre-allocated sub-bands #1 and #2 as illustrated in FIG. 10. DECT communication unit 32 of base unit 3 (3a) selects one of sub-bands #1 and #2 for each handset 2.

Meanwhile, in LTE communication, transmission and reception of data is performed in accordance with frequency-division multiplexing by using one of pre-allocated frequency bandwidths. FIG. 10 illustrates frequency-division duplexing (FDD) in which uplink frequency bandwidth #3 is different from downlink frequency bandwidth #4.

LTE carrier gateway 5 selects a frequency bandwidth to be used in LTE communication for each communication target such as base unit 3 and instructs the communication target to use the selected frequency bandwidth. LTE communication unit 31 of base unit 3 (3a) transmits and receives data using the frequency bandwidth that LTE carrier gateway 5 instructs base unit 3 to use.

Some DECT communication sub-band (hereinafter, referred to as "adjacent sub-band"), such as sub-band #1 in FIG. 10, is adjacent to one of the LTE communication frequency bandwidths (downlink frequency bandwidth #4 in the example of FIG. 10). When the LTE communication frequency bandwidth (hereinafter, referred to as "adjacent frequency bandwidth") is used in an LTE communication, performing a DECT communication using the adjacent sub-band may cause interference (crosstalk).

In view of this point, the fourth exemplary embodiment will be described in a case where base unit 3 avoids crosstalk. Configurations of a communication system and each device of the present exemplary embodiment are the same as those of the first exemplary embodiment and thus will not be described.

Additional Function of Base Unit

DECT baseband signal processing unit 321 of base unit 3 (3a) in the present exemplary embodiment determines whether or not the adjacent frequency bandwidth is used by (1) receiving a notification as to a frequency bandwidth used in an LTE communication from LTE baseband signal processing unit 318 and (2) detecting the field strength in the adjacent frequency bandwidth (#4 in FIG. 10) and comparing the field strength with a threshold or (3) detecting the field strength in the uplink frequency bandwidth (#3 in FIG. 10) corresponding to the downlink adjacent frequency bandwidth and comparing the field strength with a threshold. Specifically, DECT baseband signal processing unit 321, in the processes of (2) and (3), determines the adjacent frequency bandwidth not to be used in a case where the detected field strength is smaller than the threshold and determines the adjacent frequency bandwidth to be used in a case where the detected field strength is greater than or equal to the threshold.

DECT baseband signal processing unit 321 controls frequency conversion section 322 to perform DECT communication by using, in all communications with handset 2, a sub-band (#2 in FIG. 10) not adjacent to the frequency bandwidth used in the LTE communication in a case where the frequency bandwidth adjacent to a DECT communication sub-band is determined to be used in the LTE communication.

At this point, DECT communication unit 32 transmits a state notification signal indicating that a DECT link is disconnected to handset 2 that corresponds to an excess of an allowable number of the sub-band #2 in a case where the allowable number of the sub-band #2 is exceeded.

Effect

According to the present exemplary embodiment, interference induced by an LTE communication and a DECT communication on each other can be prevented by selecting a frequency to be used in the DECT communication considering a frequency to be used in the LTE communication.

The present disclosure is not limited to the above exemplary embodiments in terms of the types, dispositions, numbers, and the like of members and can be appropriately modified to the extent not departing from the gist of the disclosure, such as appropriately replacing the constituents of the exemplary embodiments by those achieving the same effect.

For example, while above each exemplary embodiment is described in a case where a target device with which handset 2 communicates through base unit 3 (3a) and the like is IP phone 7, the present disclosure is not limited thereto. The target device may be other terminals such as an LTE terminal (smartphone).

While above each exemplary embodiment is described in a case where the link connection state and the like are displayed as character information such as "No DECT Connection", "No LTE Connection", "standby", "dialing", and "Low LTE Level", the present disclosure is not limited thereto. Notifications may be provided by using audio and the like instead of the character information or in addition to the character information.

The link connection state and the like in the present disclosure can be displayed as icons instead of character information.

While above each exemplary embodiment is described in a case where data is transferred between an LTE base station and a DECT terminal, the present disclosure is not limited thereto. The present disclosure can also be applied to a case where data is transferred between a base station of a wide area wireless network other than LTE, such as GSM (registered trademark) and WCDMA (registered trademark), and a terminal connected by a local wireless network or a short-range wireless network such as a WLAN and Bluetooth (registered trademark).

A communication device according to the present disclosure can be suitably used in a communication system that uses both DECT communication and LTE communication.

What is claimed is:

1. A communication device comprising:
a Digital Enhanced Cordless Telecommunications (DECT) communication unit that performs DECT communication with a DECT terminal; and
a wide area wireless communication unit that transmits and receives data with the DECT communication unit and performs wide area wireless communication with a wide area wireless carrier gateway through a wide area wireless base station,
wherein the DECT communication unit transmits a connection verification request to the wide area wireless communication unit in order to verify a connection state of a wide area wireless link with the wide area wireless carrier gateway,
the wide area wireless communication unit transmits a connection verification response to the DECT communication unit in response to the connection verification request in a case where the wide area wireless link is connected, and
the DECT communication unit, in a case where the DECT communication unit receives a DECT connection request for requesting connection of a DECT link from the DECT terminal and receives the connection verification response from the wide area wireless communication unit, transmits a DECT connection response to the DECT terminal in response to the DECT connection request.

2. The communication device of claim 1,
wherein the wide area wireless communication unit stops transmitting the connection verification response to the DECT communication unit in a case where the wide area wireless link is disconnected, and
the DECT communication unit transmits a state notification signal indicating that the wide area wireless link is disconnected to the DECT terminal in a case where the DECT communication unit does not receive the connection verification response within a predetermined period of time from transmission of the connection verification request.

3. The communication device of claim 1,
wherein the wide area wireless communication unit, when the wide area wireless communication unit receives the connection verification request from the DECT communication unit, determines whether a radio wave condition on the wide area wireless link is good or degraded and transmits information indicating a determination result to the DECT communication unit, and
the DECT communication unit transmits a state notification signal indicating that the radio wave condition is degraded to the DECT terminal.

4. The communication device of claim 3, wherein the wide area wireless communication unit measures a level of electric fields, determines the radio wave condition to be good in a case where the level of electric fields is greater than or equal to a threshold, and determines the radio wave condition to be degraded in a case where the level of electric fields is smaller than the threshold.

5. The communication device of claim 3, wherein the wide area wireless communication unit measures a bit error rate, determines the radio wave condition to be good in a case where the bit error rate is smaller than a threshold, and determines the radio wave condition to be degraded in a case where the bit error rate is greater than or equal to the threshold.

6. The communication device of claim 1, further comprising:
- a wireless Local Area Network (WLAN) communication unit that performs wireless LAN communication with a wireless LAN terminal; and
- a router that mediates data transfers among the wide area wireless communication unit, the DECT communication unit, the wireless LAN communication unit, and LAN connection equipment,
- wherein the router performs a data transfer for audio communication between the wide area wireless communication unit and the DECT communication unit with higher priority than a data transfer for data communication between the wide area wireless communication unit and the wireless LAN communication unit or than a data transfer for data communication between the wide area wireless communication unit and the LAN connection equipment.

* * * * *